United States Patent
Karl

(10) Patent No.: US 8,622,162 B2
(45) Date of Patent: Jan. 7, 2014

(54) ENGINE COMPARTMENT COOLING SYSTEM

(76) Inventor: Thomas Karl, Federal Heights, CO (US)

( * ) Notice: Subject to any disclaimer, the term of this patent is extended or adjusted under 35 U.S.C. 154(b) by 404 days.

(21) Appl. No.: 12/807,713

(22) Filed: Sep. 14, 2010

(65) Prior Publication Data

US 2011/0139525 A1 Jun. 16, 2011

Related U.S. Application Data

(63) Continuation-in-part of application No. 12/657,969, filed on Feb. 1, 2010.

(60) Provisional application No. 61/283,941, filed on Dec. 11, 2009.

(51) Int. Cl.
*B60K 11/02* (2006.01)

(52) U.S. Cl.
USPC .......................................... 180/68.1; 165/41

(58) Field of Classification Search
USPC ......... 180/68.1, 68.2, 68.4; 123/41.02, 41.05, 123/41.49, 41.7; 165/41
See application file for complete search history.

(56) References Cited

U.S. PATENT DOCUMENTS

| 2,253,438 | A | * | 8/1941 | Lutz | 180/69.5 |
| 3,696,730 | A | * | 10/1972 | Masuda et al. | 237/12.3 A |
| 3,999,598 | A | * | 12/1976 | Fehr et al. | 165/42 |
| 4,798,177 | A | * | 1/1989 | Oomura et al. | 123/41.12 |
| 4,930,455 | A | * | 6/1990 | Creed et al. | 123/41.1 |
| 6,695,047 | B2 | * | 2/2004 | Brocksopp | 165/292 |
| 6,739,290 | B2 | * | 5/2004 | Iwasaki et al. | 123/41.05 |
| 2006/0191500 | A1 | * | 8/2006 | Sugiyama et al. | 123/41.12 |
| 2008/0099261 | A1 | * | 5/2008 | Sturmon et al. | 180/68.1 |

* cited by examiner

*Primary Examiner* — Frank Vanaman
(74) *Attorney, Agent, or Firm* — Scott L. Terrell, P.C.; Scott L. Terrell

(57) ABSTRACT

An engine compartment cooling system includes an axial fan assembly and a remote mount fluid cooler assembly. The axial fan assembly and the remote mount fluid cooler assemblies are mounted in clear holes in at least one of the quarter panels. The axial fan assembly exhausts engine heat outwardly from the engine compartment through the quarter panel. The fluid cooler assembly receives ambient air through the quarter panel into the engine compartment. The axial fan and fluid cooler assembles are controlled using, sensors, signal data, and a controller. The controller is programmed with the operation data so that the cooling system optimizes engine cooling while varying operation of the engine's cooling system, and the axial fan and the remote mount fluid cooler assemblies according to the invention.

7 Claims, 3 Drawing Sheets

ENGINE COMPARTMENT COOLING SYSTEM

CROSS REFERENCE TO RELATED APPLICATIONS

This application is a continuation-in-part of application Ser. No. 12/657,969, filed 1 Feb. 2010, which claims the benefit of U.S. Ser. No. 61/283,941, filed 11 Dec. 2009, pursuant to 35 U.S.C. 111(b).

BACKGROUND OF THE INVENTION

1. Field of the Invention

The present invention relates to engine compartment cooling systems. In particular, it relates to an axial fan and heat exchanger operated system for thermal management of the interior of an engine compartment mounted through the quarter panel of a motor vehicle.

2. Description of the Related Art

Systems for cooling the engine of a motor vehicle are well known in the art. Engine compartments have long since been equipped with a heat exchanger, such as a radiator, and fan assembly for cooling a liquid circulating through the engine block and heat exchanger of the motor vehicle. However, auxiliary systems are desirably in order to either supplement or to enhance engine cooling during operation under hot or heavy load conditions.

One such example is disclosed in U.S. Pat. No. 5,709,175 to Carroll. There, a cooling air system for an internal combustion engine has an engine enclosure and a plenum connected to the engine enclosure. A radial flow fan is disposed in the plenum. An inlet duct in the engine compartment directs drawn outside ambient air toward a radiator located within the engine compartment. A shroud extending into the plenum directs air flow passing through the radiator axially toward the radial flow fan. An outlet opening at the top end of the plenum exhausts radially directed heated air flow elevationally to the atmosphere.

While the foregoing systems offer some utility, a major disadvantage in such systems lies in the fact that they are complicated in construction, often require unsightly design changes to the engine compartment, are costly in construction, and circulate ambient air from the outside of the vehicle through the engine compartment. Thus, what is needed is an engine compartment cooling system which is simple in construction and which is capable of retrofit application with an existing engine compartment construction. It is also needed to provide a supplemental engine cooling system which is easy to install and operate, light in weight and which exhausts engine heat generated by the engine through a fender well of the motor vehicle. The present invention satisfies these needs.

BRIEF SUMMARY OF THE INVENTION

It is therefore an object of the present invention to provide an engine compartment cooling system which exhausts engine heat through a fender well of a motor vehicle.

It is another object of the present invention to provide an engine compartment cooling system which is easily installed for retrofit application, on an existing quarter panel, of a motor vehicle.

It is another object of the present invention to provide an engine compartment cooling system which is light in weight, low in cost, and easily operated either manually from the interior of a passenger compartment or thermostatically.

To overcome the problems of the prior art methods and in accordance with the purpose of the invention, as embodied and broadly described herein, briefly in combination with an engine compartment having an engine, a hood, and at least two front quarter panel side walls defining an interior engine compartment, an engine compartment cooling system, is provided which includes a clear hole in at least one of the side walls positioned between a passenger compartment and a forward portion of a fender wheel well. At least one axial fan assembly has a fan housing, a plurality of fan blades, a motor shaft, and a fan motor. The fan assembly is mounted in the clear hole. A fan motor control system is operatively connected to a first temperature sensor for sensing a temperature of the engine compartment, and sending a first signal data to a controller operable to optimize a fan speed of the fan assembly based on the temperature of the engine compartment. A heated air flow path originates from the engine compartment and is exhausted outwardly through the fan assembly into an ambient air engine compartment and is exhausted outwardly through the fan assembly into an ambient air flow for cooling of the engine compartment.

Additional advantages of the present invention will be set forth in part in the description that follows and in part will be obvious from that description or can be learned from practice of the invention. The advantages of the invention can be realized and obtained by the apparatus particularly pointed out in the appended claims.

BRIEF DESCRIPTION OF THE SEVERAL VIEWS OF THE DRAWINGS

The accompanying drawings, which are incorporated in and which constitute a part of the specification illustrate at least one embodiment of the invention and, together with the description, explain the principles of the invention.

DETAILED DESCRIPTION OF THE INVENTION

Figure 1:
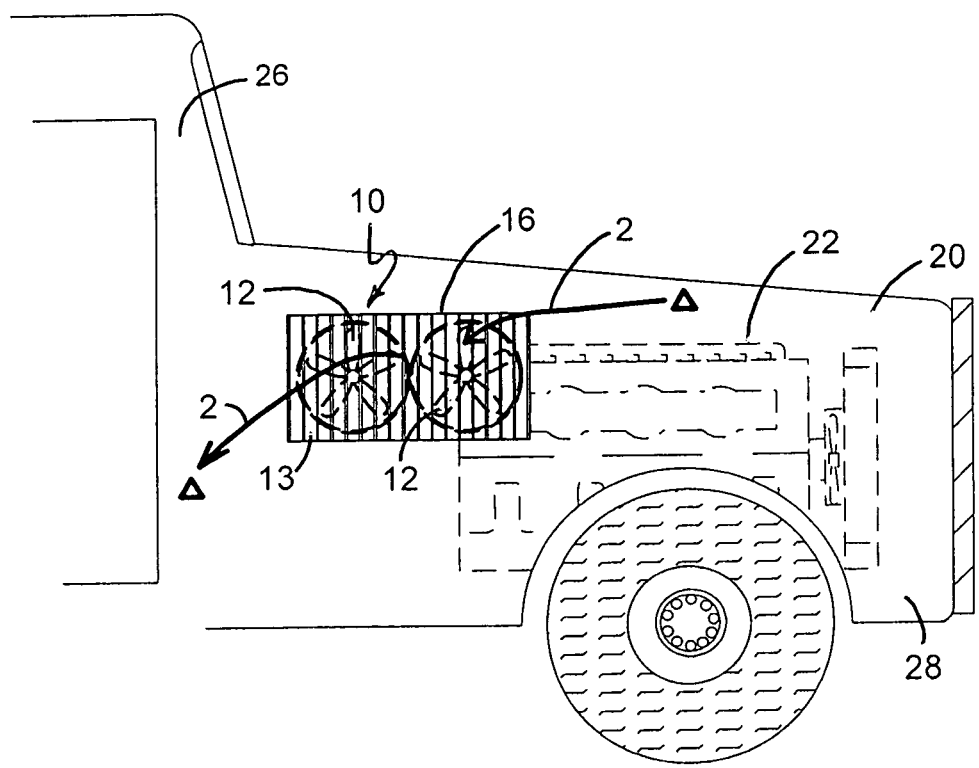
FIG. 1 is a side view of the present invention when mounted on the quarter panel of a motor vehicle.
Figure 2:
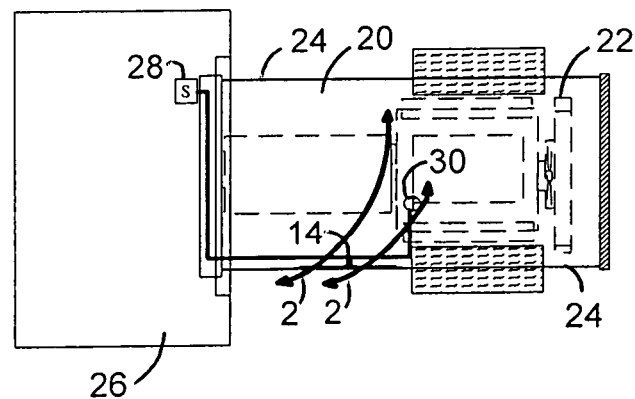
FIG. 2 is a top view of the present invention when mounted on the quarter panel of a motor vehicle.

Unless specifically defined otherwise, all technical or scientific terms used herein have the same meaning as commonly understood by one of ordinary skill in the art to which this invention belongs.

Although any of the methods and materials similar or equivalent to those described herein can be used in the practice or testing of the present invention, the preferred methods and materials are now described. Reference will now be made in detail to the presently preferred embodiments of the invention, examples of which are illustrated in the accompanying drawings wherein like numerals represent like features of the invention.

Referring now to the drawing figures, the preferred embodiment of the An engine compartment cooling system is provided. The engine compartment includes an engine 22, a hood, and at least two front quarter panel side walls 24 which define an interior engine compartment 20. Such engine compartments are of a configuration which is well known in the diesel tractor and automotive industry as well known in the art. A clear hole, such as a rectangular opening, is positioned in at least one of the side walls 24, preferably between the passenger compartment 26 and a forward portion 28 of a fender wheel well. The clear hole is desirably positioned high enough in relation to the engine 22 so that the heated air flow 2 originating from the engine 22 travels upwardly and outwardly. A fan housing assembly 10 is mounted adjacent to the clear hole and defines a hot air inlet from the interior of the engine compartment and an outlet which exhausts the hot air outwardly to ambient. A heated air flow path 2 originates at the engine 22, heating the engine compartment interior 20, while operating under heavy loads, and extends outwardly to exhaust into the ambient air through the clear hole. At least one axial fan assembly 10 is mounted to a fan housing 16. The fan housing 16 is fitted within the quarter panel 24 in the clear hole. The fan is of a design which is well known as an axial fan and includes a plurality of fan blades 12, a motor shaft 14 and a fan motor. The fan assembly 10 is mounted in the housing 16 so that the air flow path 2 is exhausted in a direction which is travels along a path relative to the motor shaft 14. The fan motor is wired to any direct-current power source of the motor vehicle which is well known in the art.

The fan motor is preferably manually operated by motor controller, such as a toggle or rheostat switch 52, positioned within the interior of the passenger compartment 26, such as on a dashboard, but, may, also be thermostatically operated using a signal received from a sensor 30 desirably positioned within the interior of the engine compartment 20. In the preferred embodiment, the fan housing 16 is a rectangular shaped frame and is thereby configured to receive at least two axial fans and fan motor assemblies. It is also desirable to include an air flow exhaust shutter 13 assembly connected to the housing 16 so that the air flow path 2 is variably restricted from control of temperature within the interior engine compartment 20. The exhaust shutter 13 is desirably an air flow baffle which pivots either vertically or horizontally in relation to the housing 16. The shutter 13 may be either manually operated from the passenger compartment 26, or thermostatically operated as a result of engine temperature, or both.

Figure 3:
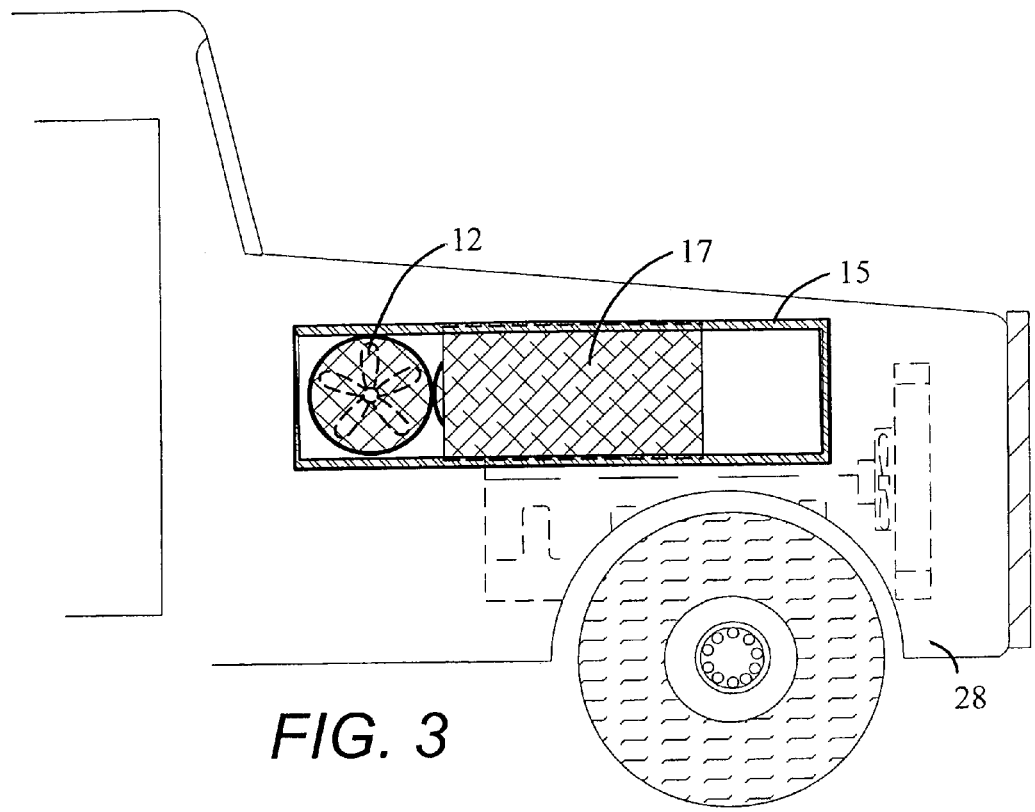
FIG. 3 is a side view of the present invention with another embodiment of the exhaust shutter when mounted on the quarter panel of a motor vehicle.
Figure 4:
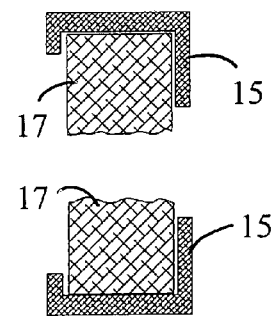
FIG. 4 is a sectional view of the exhaust shutter assembly shown in FIG. 3.
Figure 5:
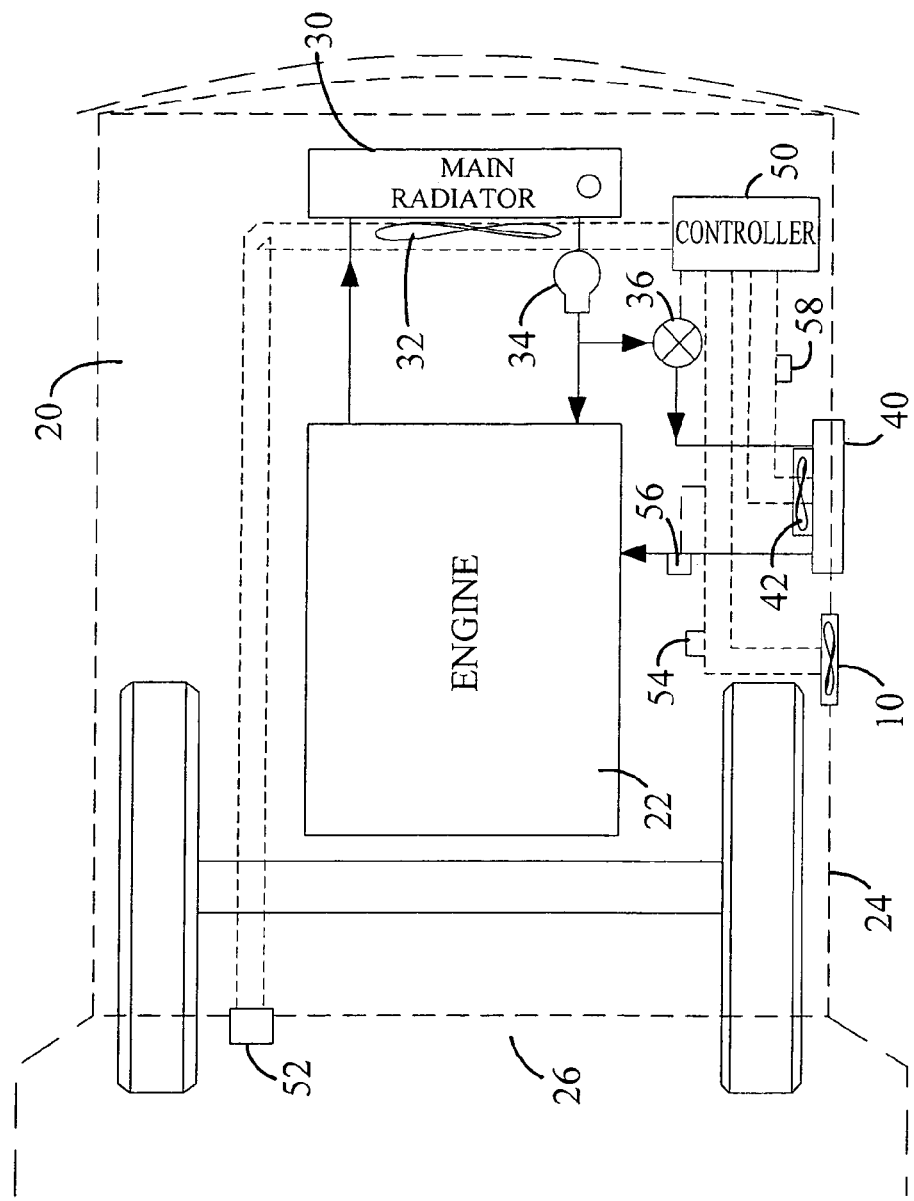
FIG. 5 is yet another embodiment of the present invention showing a top schematic view including a remote mount fluid cooler mounted in the quarter panel of a motor vehicle together with sensors and a pump valve for thermal management of the engine compartment.

Referring now to FIGS. 3 and 4, in yet another embodiment of the present invention, the air flow exhaust shutter 17 slides freely, forward and rearward, within a channeled, generally rectangular, frame member 15. The exhaust shutter 17 is preferably produced from an aluminum or fiberglass sheeting, painted, and operates in an open position so as to allow the airflow to exhaust from the engine compartment 20 for cooling, or in a closed position, under colder operating conditions, so that the engine compartment retains heat and the fan blades 12 do not engage in an autorotation when exposed to ambient air while travelling. The channeled frame member 15 is a metal frame having flanged portions for slidably receiving the exhaust shutter 17, and mounting to the quarter panel with a threaded fastener or rivet. The frame member 15 is rigidity fastened to an outer wall of the quarter panel 24. In use, one simply slides the exhaust shutter 17 in a predetermined forward or rearward alignment, with respect to the fan assembly 10, for optimum temperature control of the engine compartment. The exhaust shutter 17 may also, but need not, include a motor drive and control (not shown) for manually or thermostatically operating the exhaust shutter 17 in a forward or rearward direction.

In yet another embodiment of the present invention, the cooling system may, but need not, include a second remote mount fluid cooler loop in addition to the fan loop, described above. This remote mount fluid cooling loop includes a liquid-to-air heat exchanger 40, engine coolant valve 36, temperature sensor 58, and fan 42 components, and is useful to supplement the main radiator 30 and primary fan 32 engine coolant system in order to further optimize thermal management of the engine 22 and interior of the engine compartment 20. In this manner, the remote mount thermal management cooling system may employ the use of one or more manual or electric fluid pumps 34, electric valves 36 and electric fans 12, 42. These electric components may replace one or more mechanical components which typically operate in accordance with the speed and temperature of the engine. The remote mount fluid cooler assembly preferably includes a stacked plate cooler core and waterproof/dustproof fan motor housed in an aluminum shroud and mounting bracket for mounting in the fender well of the motor vehicle.

The remote mount engine temperature control loop includes a fan 42 and a heat exchanger or radiator 40. A temperature sensor 56 senses the temperature of the engine coolant, and sends a signal to the controller 50 which is related to the sensed temperature. Based on the sensed temperature of the engine coolant, the controller 50 can command the mechanical or electrically operated valve 36, to allow some or all of the engine coolant to pass through the radiator 40, thereby facilitating heat exchange from the engine coolant to the ambient air. Conversely, the controller 50 can command the valve 36 into a full bypass condition, such that all of the engine coolant by basses the radiator 40, and is pumped back into the engine 22 at times, such as just after engine startup and before the engine 22 has reached a desired operating temperature.

In addition to the engine coolant temperature sensor 56, temperature sensors 54 and 58 are also in communication with the controller 50. The temperature sensor 54 senses the temperature of the heated air in the engine compartment 20, as it leaves the engine 22, where the controller 50 can command the fan motor, of the fan assembly 10, to operate so that heated air 2 is exhausted from the engine compartment 20 through the fender well and into the ambient air. Conversely, the controller 50 can command the fan assembly 10 to switch to an off condition when not in use. Likewise, temperature sensor 58 also senses the temperature of the heated air 2, in the engine compartment 20, where the controller 50 can command the fan 42 to operate either together with, or independently of, the fan assembly 10 in order to thermally manage the engine 22 and engine compartment 20 under a wide variety of operating conditions in order to maximize power efficiency. In order to optimize operation of the fan assembly 10, fan 42 and valve 36, the controller 50 is programmed with operation data that provides optimized operating speeds and engine coolant circulation loops for the combined operation of the fan assembly 10, fan 42 and the valve 36. Each of these operating speeds and coolant loops corresponds to an amount of heat transfer between the engine coolant, engine 22, and the engine compartment 20. Based at least in part on inputs from the temperature sensors 54, 56, and 58, the controller 50 uses the operation data to operate the fan assembly 10, fan 42, and the valve 36 to provide the desired amount of heat transfer between the engine 22, engine compartment 20 and the engine coolant, while minimizing the power consumption during operation of the motor vehicle under a wide variety of operating load conditions.

In use, the switch 52 is also in communication with the controller 50 and may include visual indicators so that the operator is able to view the temperature sensed operating conditions input to the controller 50 by the sensors 54, 56, and 58 in order to manually override the controller output command signals to the valve 36, pump 34, fans 10 and 42, and heat exchanger 40. In this manner, the operator maintains the ability to override independent control of each component of the thermal management system in order to optimize operation of the various components of the system.

While the present invention has been described in connection with the embodiments as described and illustrated above, it will be appreciated and understood by one of ordinary skill in the art that modifications may be made in the cooling system assembly, in accordance with the present invention, without departing from the true spirit and scope of the invention as described and claimed herein.

I claim:

1. In combination with an engine compartment having an engine, a hood, and at least two front quarter panel side walls defining an interior engine compartment, an engine compartment cooling system, comprising:
   (a) a clear hole in at least one of the side walls positioned between a passenger compartment and a forward portion of a fender wheel well;
   (b) at least one axial fan assembly having a fan housing, a plurality of fan blades, a motor shaft, and a fan motor, the fan assembly mounted in the clear hole;
   (c) a fan motor control system operatively connected to a first temperature sensor for sensing a temperature of the engine compartment and sending a first signal data to a controller operable to optimize a fan speed of the fan assembly based on the temperature of the engine compartment;
   (d) a heated air flow path which originates from the engine and is exhausted outwardly through the fan assembly into an ambient air flow for cooling of the engine compartment; and
   (e) a remote mount fluid cooler assembly including a temperature control fluid, a second temperature sensor for sensing a temperature of the temperature control fluid and sending a second signal data to the controller related to the temperature of the temperature control fluid, a heat exchanger for transferring heat between the temperature control fluid and ambient air, wherein the fan is operable to move the ambient air across the heat exchanger, a pump operable to pump the temperature control fluid through the heat exchanger, and a valve in fluid communication with the pump and the heat exchanger, and wherein the controller is operatively connected to the temperature sensors, the fan, and the valve, and programmed with operation data providing optimized operating speed for combined operation of the fan, and optimized temperature control fluid flow rates from the pump to the heat exchanger which are based at least in part on the operation data and signals received from the temperature sensors.

2. The engine compartment cooling system according to claim 1, further comprising an exhaust shutter assembly connected to the housing so that the air flow path is variably restricted.

3. The engine compartment cooling system according to claim 2, wherein the exhaust shutter is thermostatically operated based on the signal data received from the temperature sensors.

4. The engine compartment cooling system according to claim 2, wherein the exhaust shutter further comprises a plurality of air-flow baffles, wherein said baffles are adapted to variably restrict the air flow when operated inwardly.

5. In combination with an engine compartment having an engine, a hood, and at least two front quarter panel side walls defining an interior engine compartment, a thermal management cooling system, comprising:
   (a) a first clear hole in at least one of the side walls positioned between a passenger compartment and a forward portion of a fender wheel well;
   (b) a first axial fan assembly having a fan housing, a plurality of fan blades, a motor shaft, and a fan motor, the fan assembly mounted in the first clear hole;
   (c) a heated air flow path which originates from the engine and is exhausted outwardly through the fan assembly into an ambient air flow for cooling of the engine compartment;
   (d) a second clear hole in at least one of the side walls positioned between the passenger compartment and a forward portion of the fender wheel well;
   (e) a remote mount fluid cooler assembly mounted in the second clear hole including a temperature control fluid, a second temperature sensor for sensing a temperature of the temperature control fluid, a heat exchanger for transferring heat between the temperature control fluid and ambient air, a second fan operable to move the ambient air across the heat exchanger, a pump operable to pump the temperature control fluid through the heat exchanger, and a valve in fluid communication with the pump and the heat exchanger; and
   (f) a control system operatively connected to the temperature sensors and the valve, wherein the temperature sensors and sending a first and second signal data to a controller operatively connected to the temperature sensors, the fans, and the valve, and programmed with operation data providing optimized operating speeds for the fans and temperature control fluid flow rates for combined operation of the fans, and optimized temperature control fluid flow from the pump to the heat exchanger which are based at least in part on the operation data and signals received from the temperature sensors.

6. The engine compartment cooling system according to claim 5, said system further comprising a switch for manual operation of the control system.

7. The engine compartment cooling system according to claim 5, wherein said system further comprises an exhaust shutter assembly connected to the first axial fan assembly housing and the controller so that the air flow path is variably restricted based on the signals received from the temperature sensors.

* * * * *